US010205837B2

(12) United States Patent
Umeizumi

(10) Patent No.: US 10,205,837 B2
(45) Date of Patent: *Feb. 12, 2019

(54) ELECTRONIC APPARATUS AND DISPLAY CONTROL METHOD

(71) Applicant: RICOH COMPANY, LTD., Tokyo (JP)

(72) Inventor: Genki Umeizumi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 13 days.

This patent is subject to a terminal disclaimer.

(21) Appl. No.: 15/347,937

(22) Filed: Nov. 10, 2016

(65) Prior Publication Data
US 2017/0064107 A1 Mar. 2, 2017

Related U.S. Application Data

(63) Continuation of application No. 14/024,910, filed on Sep. 12, 2013, now Pat. No. 9,524,082.

(30) Foreign Application Priority Data

Sep. 18, 2012 (JP) .................. 2012-204444
Jul. 8, 2013 (JP) .................. 2013-142603
Jul. 8, 2013 (JP) .................. 2013-142610

(51) Int. Cl.
G06F 3/14 (2006.01)
H04N 1/00 (2006.01)
G06F 3/0484 (2013.01)

(52) U.S. Cl.
CPC ....... H04N 1/00503 (2013.01); G06F 3/0484 (2013.01); G06F 3/1454 (2013.01);
(Continued)

(58) Field of Classification Search
None
See application file for complete search history.

(56) References Cited

U.S. PATENT DOCUMENTS 9,524,082 B2 * 12/2016 Umeizumi ......... H04N 1/00411
2006/0085676 A1 4/2006 Kobayashi et al.
(Continued)

FOREIGN PATENT DOCUMENTS

CN 101388937 A 3/2009
CN 102158618 A 8/2011
(Continued)

OTHER PUBLICATIONS

Office Action dated Mar. 28, 2017 in Japanese patent application No. 2013-142610.
(Continued)

Primary Examiner — John R Wallace
(74) Attorney, Agent, or Firm — Oblon, McClelland, Maier & Neustadt, L.L.P.

(57) ABSTRACT

An electronic apparatus connectable to another electronic apparatus includes an information acquisition unit that acquires operation screen information to display a shared operation screen shared between the electronic apparatus and the other electronic apparatus from the other electronic apparatus, a shared screen display unit that displays the shared operation screen based on the operation screen information that the information acquisition unit acquired, a job execution unit that executes a job based on input to the shared operation screen, an event detector that detects a predetermined event that occurs during the job execution, a display determination unit that determines whether or not a specific screen including information specific to the electronic apparatus model is displayed in response to the detected predetermined event, and a specific screen display unit that changes the displayed shared operation screen into the specific screen if the display determination unit determines that the specific screen is displayed.

7 Claims, 17 Drawing Sheets

(52) U.S. Cl.
CPC ..... *H04N 1/00204* (2013.01); *H04N 1/00244* (2013.01); *H04N 1/00347* (2013.01); *H04N 1/00411* (2013.01); *H04N 1/00466* (2013.01); *H04N 1/00474* (2013.01); *H04N 1/00482* (2013.01); *H04N 2201/0039* (2013.01); *H04N 2201/0094* (2013.01)

(56) References Cited

U.S. PATENT DOCUMENTS

| | | |
|---|---|---|
| 2006/0245780 A1 | 11/2006 | Yamada |
| 2007/0201050 A1 | 8/2007 | Mochizuki et al. |
| 2007/0236730 A1 | 10/2007 | Takeuchi et al. |
| 2008/0304101 A1* | 12/2008 | Sasase ............... G06F 3/1204 358/1.15 |
| 2009/0125599 A1 | 5/2009 | Koide |
| 2009/0213416 A1* | 8/2009 | Ishigure ............ G06F 9/4411 358/1.15 |
| 2011/0157631 A1 | 6/2011 | Tsutsumi |
| 2011/0261411 A1 | 10/2011 | Mochizuki et al. |
| 2011/0292428 A1 | 12/2011 | Ishii |
| 2012/0133966 A1 | 5/2012 | Sako |
| 2012/0133982 A1 | 5/2012 | Nagai et al. |
| 2012/0174962 A1 | 7/2012 | Koningstein et al. |
| 2012/0274962 A1* | 11/2012 | Thomas ............. H04N 1/00015 358/1.12 |

FOREIGN PATENT DOCUMENTS

| | | |
|---|---|---|
| JP | 2001-306204 | 11/2001 |
| JP | 2004-144780 A | 5/2004 |
| JP | 2004-328276 A | 11/2004 |
| JP | 2007-279974 | 10/2007 |
| JP | 2008-283436 | 11/2008 |
| JP | 2011-178109 A | 9/2011 |
| JP | 2011-232971 | 11/2011 |
| JP | 2011-245763 A | 12/2011 |
| JP | 2012-119751 A | 6/2012 |

OTHER PUBLICATIONS

Office Action dated Apr. 11, 2017 in Japanese patent application No. 2013-142603.
Combined Office Action and Search Report dated Aug. 26, 2015 in Chinese Patent Application No. 201310379228.1 (with English Translation of Category of Cited Documents).
Office Action dated Sep. 25, 2018, in Japanese Patent Application No. 2017-199441.

* cited by examiner

FIG. 3

| USER NAME | APPLICATION NAME | ICON | LOCATION COORDINATE | LAST UPDATED |
|---|---|---|---|---|
| A | COPY | Copy.ico | (1, 1) | June 10, 2012 12:06 |
| | DOCUMENT BOX | Document box.ico | (1, 2) | |
| | FACSIMILE | Facsimile.ico | (1, 3) | |
| | PRINTER | Print.ico | (1, 4) | |
| | SCANNER | Scan.ico | (2, 1) | |
| | SDK | SDK.ico | (2, 2) | |
| | URL | URL.ico | (2, 3) | |
| B | COPY | Copy.ico | (1, 1) | September 2, 2012 10:24 |
| | DOCUMENT BOX | Document box.ico | (1, 2) | |
| | FACSIMILE | Facsimile.ico | (1, 3) | |
| | PRINTER | Print.ico | (1, 4) | |
| | SCANNER | Scan.ico | (2, 1) | |
| | SDK1 | SDK.ico | (2, 2) | |
| | URL | URL.ico | (2, 3) | |
| | SDK2 | SDK.ico | (2, 4) | |
| C | COPY | Copy.ico | (1, 1) | October 12, 2011 16:47 |
| | FACSIMILE | Facsimile.ico | (1, 2) | |
| | PRINTER | Print.ico | (1, 3) | |
| | SCANNER | Scan.ico | (1, 4) | |
| | URL | URL.ico | (2, 1) | |

FIG. 7

| USER NAME | ORIGINAL AND OUTPUT | REDUCE/ ENLARGE | COMBINE | SORT/STACK | STAPLE | PUNCH | LAST UPDATED |
|---|---|---|---|---|---|---|---|
| A | 1 SIDED → 2 SIDED: T TO T, 2 SIDED → 2 SIDED | 50%, 71% | 2in1, 4in1, 8in1 | SORT, ROTATE SORT, STACK | TOP LEFT, 2 LEFT | NONE | JUNE 10, 2012 12:10 |
| B | 1 SIDED → 2 SIDED: T TO B, 1 SIDED → 2 SIDED COMBINED (2in1) | 50%, 61% | 2in1, 4in1 | SORT | TOP LEFT SLANT, BOTTOM LEFT | NONE | SEPT 2, 2012 10:30 |
| C | 1 SIDED → 2 SIDED: T TO T, 1 SIDED → 2 SIDED COMBINED (8in1) | 50%, 71%, 141% | 2in1 | SORT, STACK | NONE | NONE | OCT 12, 2011 17:05 |

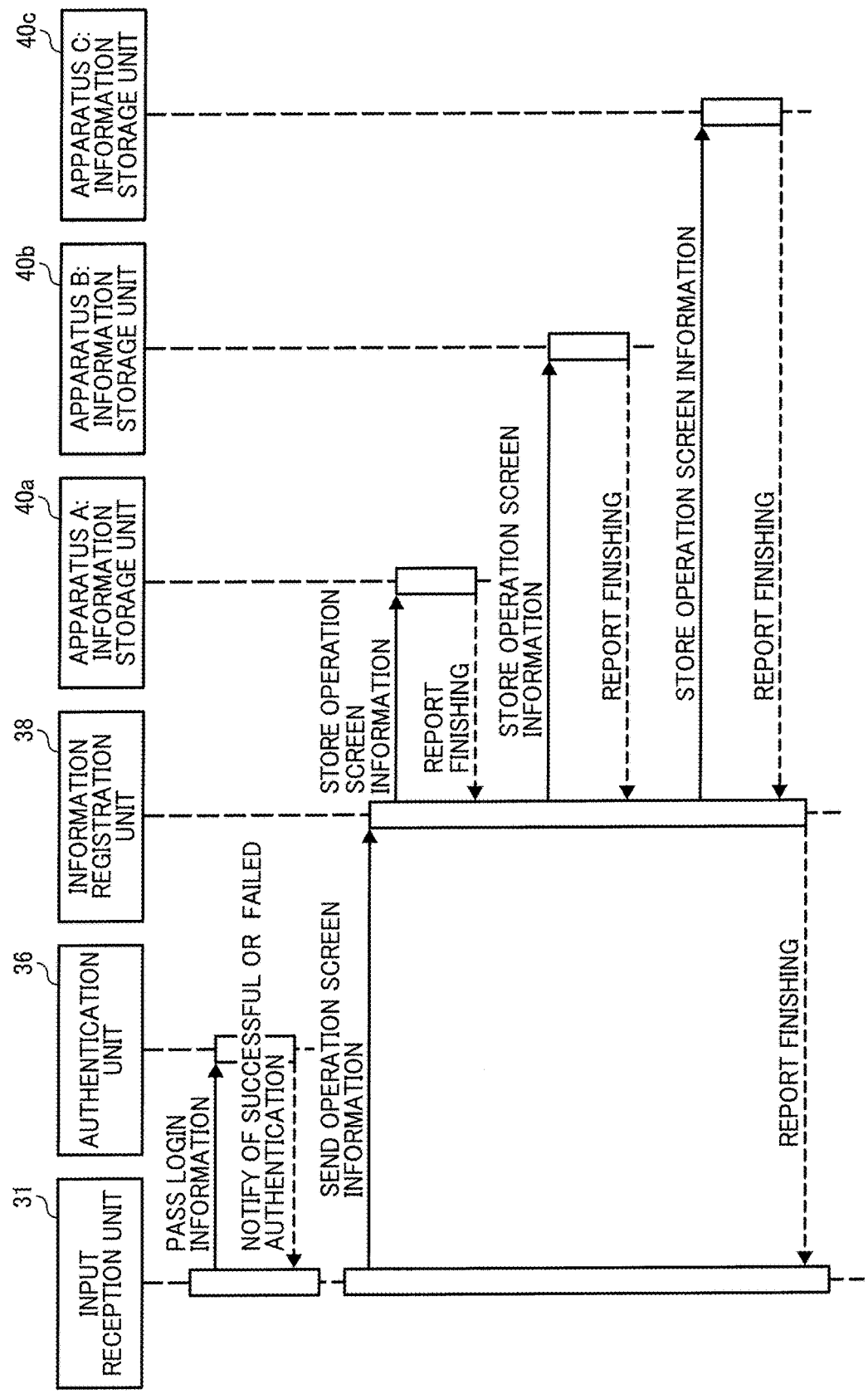

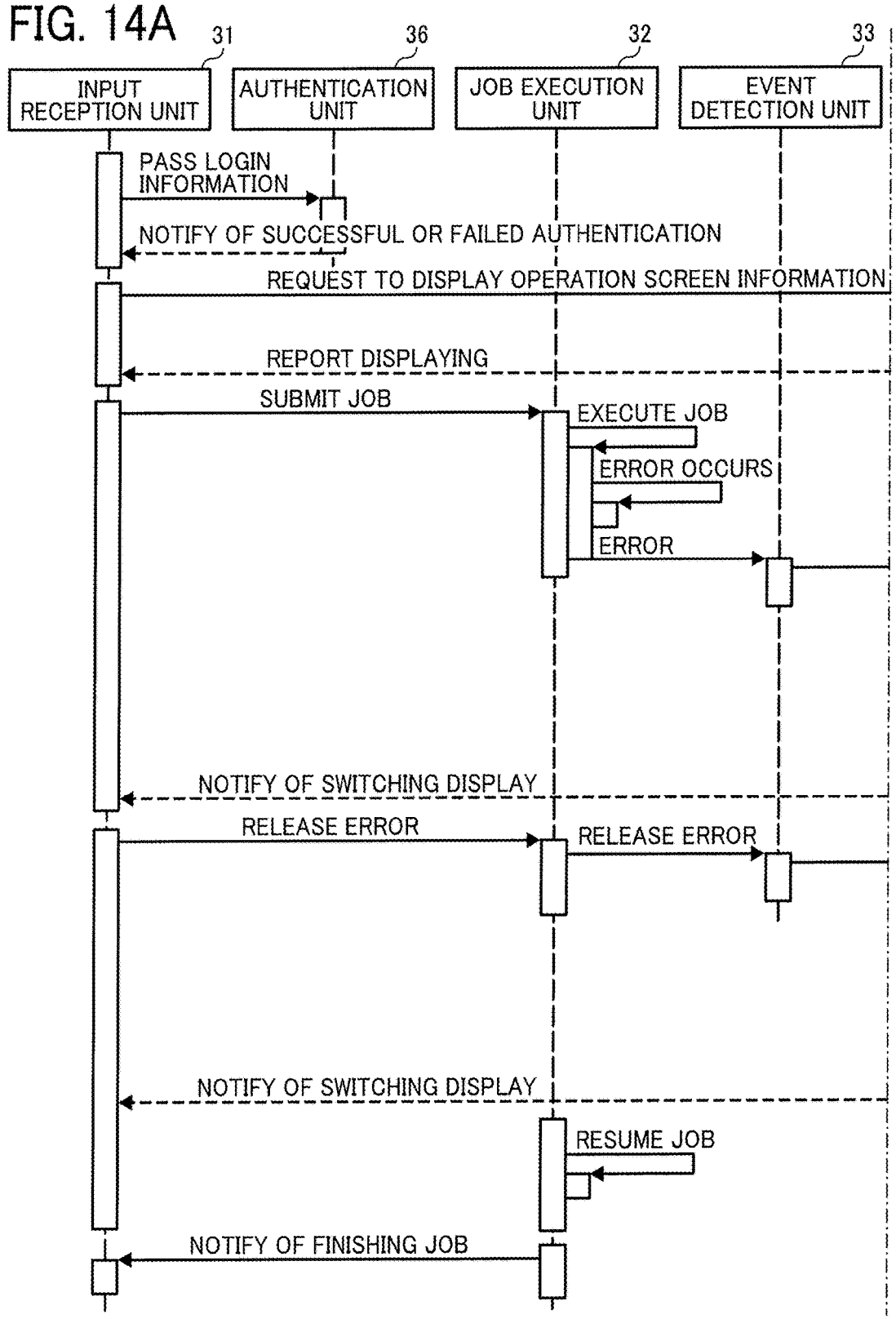

ELECTRONIC APPARATUS AND DISPLAY CONTROL METHOD

CROSS-REFERENCE TO RELATED APPLICATION

This application is a continuation Application of U.S. application Ser. No. 14/024,910, filed Sep. 12, 2013, which is based on and claims priority pursuant to 35 U.S.C. § 119 to Japanese Patent Application No. 2012-204444, filed on Sep. 18, 2012, No. 2013-142603, filed on Jul. 8, 2013, and No. 2013-142610, filed on Jul. 8, 2013. The entire contents of the above-identified applications are incorporated herein by reference.

BACKGROUND

Technical Field

The present invention relates to an electronic apparatus and display control method.

Background Art

Recently, in using multiple electronic apparatuses such as Multi Function Peripherals (MFPs) connected to a network, a technology that facilitates using the same operation screen for all MFPs by configuring the operation screen on one MFP without configuring a special operation screen on each MFP has been proposed (e.g., JP-2008-283436-A.)

There are various MFP models that differ depending on what functions are installed and their configurations. If all MFPs connected to a network are the same model, it is possible to share the same operation screen described above and use the same operation screen on each MFP. However, in case of different models, if error that a toner is not set correctly occurs, it is necessary to display an error message that shows a setting position and setting method for the model (the error message specific to the model) in order to resolve the error appropriately since the setting position and setting method of the toner varies among different models.

Therefore, conventionally, it has not been possible to share the same operation screen among different models since it is impossible to display a screen specific to the model such as an error message if the operation screen is shared among different models.

SUMMARY

The present invention provides an electronic apparatus that includes an information acquisition unit that acquires first operation screen information that is stored in another electronic apparatus and displays a shared operation screen that is shared between the electronic apparatus and the other electronic apparatus, a shared screen display unit that displays the shared operation screen on a display unit based on the first operation screen information acquired by the information acquisition unit, a job execution unit that executes a job based on input to the shared operation screen displayed on the display unit by the shared screen display unit, an event detector that detects a predetermined event during execution of the job executed by the job execution unit, a display determining unit that determines whether or not to display a specific screen that includes information specific to the electronic apparatus model when the predetermined event is detected by the event detector, and a specific screen display unit that displays the specific screen switched from the shared operation screen displayed on the display unit if it is determined that the specific screen needs to be displayed by the display determining unit.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 3 is a diagram illustrating a table stored in the electronic apparatus as an embodiment of the present invention.

FIG. 7 is a diagram illustrating a table stored in the electronic apparatus as an embodiment of the present invention.

FIG. 13 is a sequence diagram illustrating a process that registers operation screen information as an embodiment of the present invention.

FIGS. 14A and 14B are sequence diagrams illustrating a process in case an error occurs during a job as an embodiment of the present invention.

DETAILED DESCRIPTION

Figure 1:
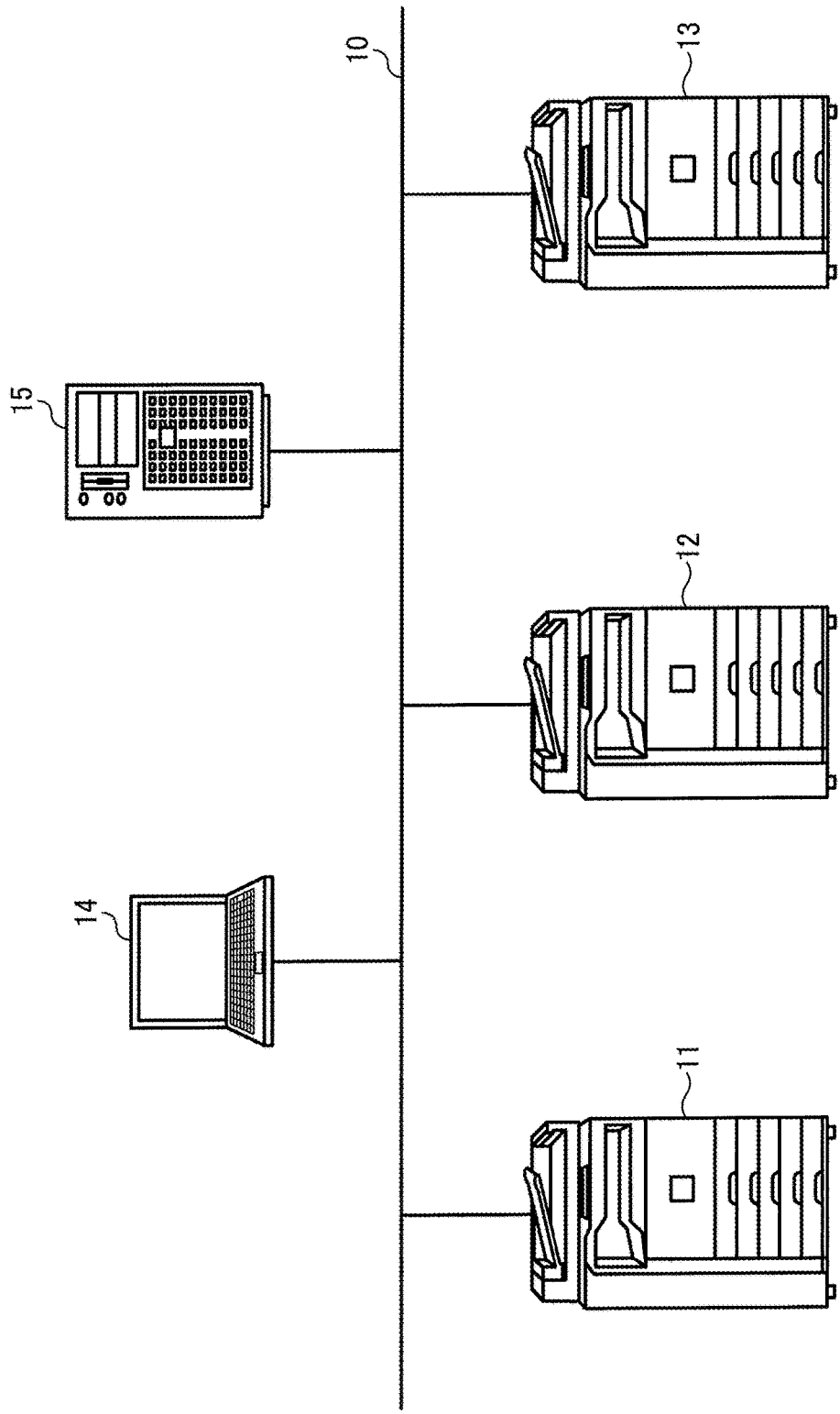
FIG. 1 is a diagram illustrating a configuration of a network system as an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

FIG. 1 is a diagram illustrating a configuration of a network system that connects multiple electronic apparatuses. A network 10 can be the internet, a Local Area Network (LAN), or a Wide Area Network (WAN). Communication via the network 10 can be performed by using communications protocols such as Transmission Control Protocol/Internet Protocol (TCP/IP) and User Datagram Protocol (UDP) in the case of the internet.

For example, multiple electronic apparatuses are comprised of three image forming apparatuses that execute printing, one Personal Computer (PC), and one shared server 15. It should be noted that electronic apparatuses are not limited to that example. For example, a printer, a copier, a facsimile apparatus, and a MFP can be used as the image forming apparatus. The shared server 15 stores a table and other data, etc., that MFPs 11, 12, and 13 and a PC 14 can refer to and share, and the shared server provides the table and other data, etc., in response to a command to acquire them from the MFPs 11, 12, and 13 and the PC 14. In this embodiment, the three MFPs 11, 12, and 13, the PC 14, and the shared server 15 are the multiple electronic apparatuses.

At least one of the MFPs 11, 12, and 13 is a different MFP model from the others. Functions described above are installed in the MFP. Taking printing function as an example, setting positions and setting methods of toner and ink, layout of paper feed tray, layout of paper ejection tray, paper feeding route, printing method, and presence or absence of functions related to printing are usually different depending on models. Examples of printing methods are electrophotographic method and inkjet method. Examples of functions related to printing are color printing function, duplex printing function, combined printing function, staple function, and punch function. An example of a function that varies from one model to another other than those related to printing is wireless communications function, etc.

The MFPs 11, 12, and 13 include a printing unit and an image scanning unit to implement the functions described above. The printing unit varies from one printing method to another. For example, in electrophotographic method, a photoconductor drum, a charging unit that charges the photoconductor drum, a photolithography device that performs writing by illuminating the charged photoconductor drum with laser beams, a development unit that performs developing by providing toner on a latent image formed on the photoconductor drum by the writing, a transfer unit that transfers the toner image formed by the development to paper, and a fixing unit that fixes the toner image transferred on the paper are provided.

The image scanning unit is comprised of a transparent glass plate on which an original, etc., to be scanned is put, a light source that illuminates the original on the glass plate with light, multiple reflecting mirrors that reflect light reflected by the original to arbitrary direction, a lens that collects light from the reflecting mirrors, an photoelectric converter that converts light collected by the lens into an electrical signal, and a sensor board that performs processes such as converting the electrical signal as an analog signal into digital data. Examples of the photoelectric converter are a Charge Couple Device (CCD) image sensor and a Complementary Metal Oxide Semiconductor (CMOS) image sensor.

Figure 2:
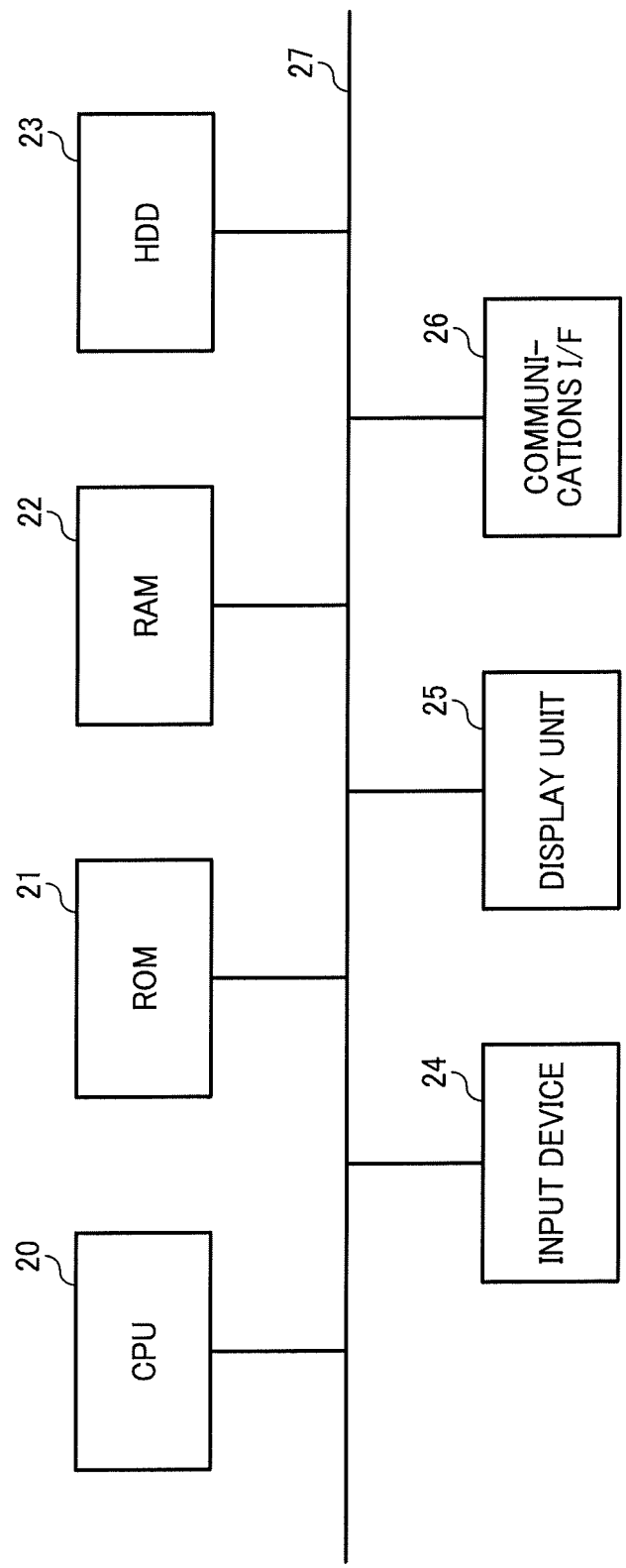
FIG. 2 is a diagram illustrating a hardware configuration of an electronic apparatus used in the network system in FIG. 1 as an embodiment of the present invention.

As shown in FIG. 2, the MFPs 11, 12, and 13 are comprised of a CPU 20 that controls the MFPs 11, 12, and 13, a Read Only Memory (ROM) 21 that stores programs read by the CPU 20, a Random Access Memory (RAM) 22 that provides a working area when the CPU 20 performs various processes, a Hard Disk Drive (HDD) 23 that stores applications and various data, etc., an input device 24 and a display unit 25 such as an input button and a control panel, and a communications I/F 26 that communicates with other MFPs and PCs, etc.

The CPU 20 and other units are connected to a bus 27 and communicate with each other via the bus 27. In addition to these units described above, the MFPs 11, 12, and 13 can include an Application Specific Integrated Circuit (ASIC) that performs imaging processes such as shading correction and gamma conversion. It should be noted that only an example of a hardware configuration is shown in FIG. 2, and the configuration is not limited to that.

As shown in FIG. 2, the PC 14 and the shared server 15 also include the CPU 20, the ROM 21, the RAM 22, the HDD 23, the input device 24, the display unit 25, and the communications I/F 26, and those units are connected with each other via the bus 27. In the case of the PC 14 and the shared server 15, examples of the input device 24 are a keyboard, a mouse, and a microphone, and an example of the display unit 25 is a liquid crystal display. It should be noted that the shared server 15 either can include the input device 24 and the display unit 25 or does not include the input device 24 and the display unit 25.

In case of performing wireless communication, an access point for wireless communication can be connected to the network 10, and it is possible to communicate with other electronic apparatuses connected to the network 10 via the access point.

A user can create a document to be printed on the PC 14, assign a specific MFP, e.g., the MFP 11, and have the MFP execute printing. In that case, the user can have the PC 14 display an operation screen to operate an application of the MFP 11 on the display unit included in the PC 14. The operation screen is created by the user preliminarily and registered as operation screen information. The user can acquire the operation screen information using the PC 14 and have the PC 14 display the operation screen based on the acquired operation screen information.

The operation screen can be displayed on not only the display unit included in the PC 14 but also a control panel of the MFPs 11, 12, and 13 or the display unit of the shared server 15 if the shared server 15 includes a display unit. Therefore, the operation screen information can be shared among apparatuses, i.e., it is shared operation screen information.

Examples of the operation screen information are application information (e.g., application name) laid out on the screen, icon information of the application (e.g., file name of the icon), coordinate locations on the screen (e.g., x-axis coordinate and y-axis coordinate), buttons laid out on a configuration screen after choosing an application, coordinate locations of the buttons, and status information during executing a job. Since these are examples, some of them can be omitted, and other information can also be included.

Each of the MFPs 11, 12, and 13, the PC 14, and the shared server 15 can store and hold the operation screen information. Otherwise, for example, only the MFP 11 can hold the operation screen information. When the operation screen is registered, a specific electronic apparatus is assigned, and the operation screen information can be stored in the HDD included in the specific electronic apparatus.

The user can register the operation screen information, read the registered operation screen information, and have the operation screen be displayed based on the read operation screen information. In that case, the user can input a user ID and password to identify the user and have the process be executed if the user authentication is successful. Therefore, it is possible to register the operation screen information associated with the user identification information to identify the user.

As described above, examples of user identification information are user ID and password. Other than that, any information that can identify the user such as address, telephone number, and credit card number can be used as the user identification information. The user identification information can be registered in an IC card, a mobile phone, and a smart phone. Biometric information such as user's fingerprint and veins can also be used as the user identification information. In this case, they are read by a dedicated reader, and authentication is performed by checking whether or not they match preregistered information.

FIG. 3 is a diagram illustrating registered operation screen information. As shown in FIG. 3, the operation screen information is registered as a table associating a user name associated with user identification information such as user ID with a name of an application laid out on the screen created by the user, a file name of an icon for each application, their coordinate locations, and last updated information for a home screen as one of the shared operation screens. In this case, home screen information for three users is registered.

Since FIG. 3 illustrates an example, it is possible to create tables for each user instead of creating tables for each screen as shown in FIG. 3. Information to be registered is not limited to those described above, and other information can be registered.

For example, user A registers and updates the home screen as one of the shared operation screens laying out icons for seven applications (copy, document box, fax, printer, scanner, Software Development Kit (SDK), and Uniform Resource Locator (URL)) from 1 row 1 column to 2 row 3 column sequentially among 12 areas divided into 3 rows and 4 columns. In this case, a simple system of coordinates from (1, 1) to (2, 3) is used. Otherwise, detailed coordinates in accordance with the number of pixels of the screen can also be used.

SDK is a tool for developing software and is a collective of libraries, etc. The library is a collective of program codes that implement specific functions for the tool. The document box is an application that stores data in the HDD 23 to perform printing and sending later. The URL is an application that notifies the authenticated user of URL where a document scanned by the scanner is stored.

Figure 4:
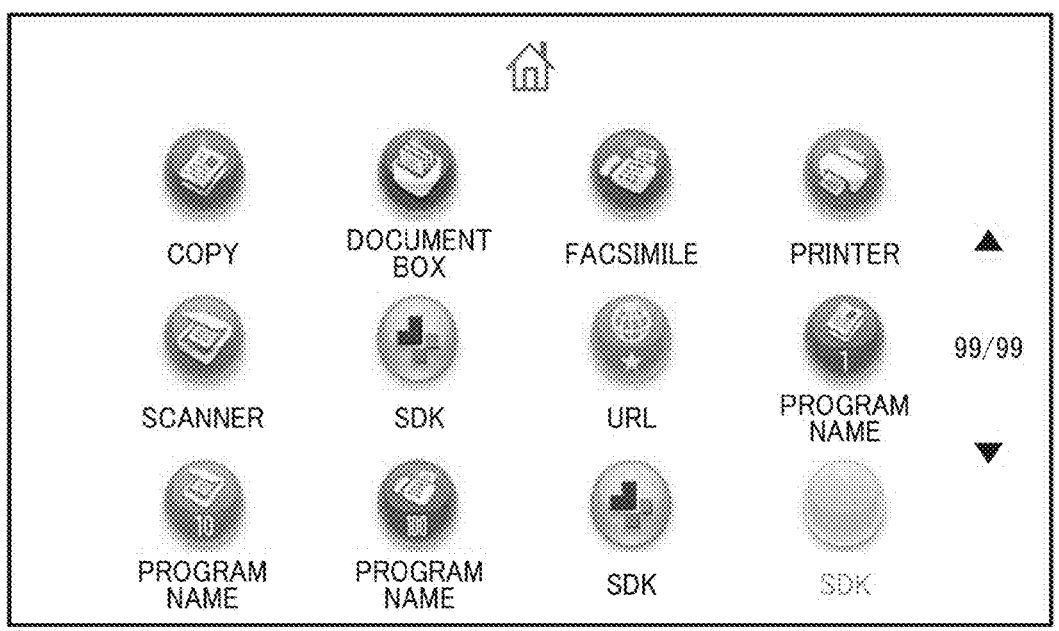
FIG. 4 is a diagram illustrating a shared operation screen that the electronic apparatus can display as an embodiment of the present invention.
Figure 5:
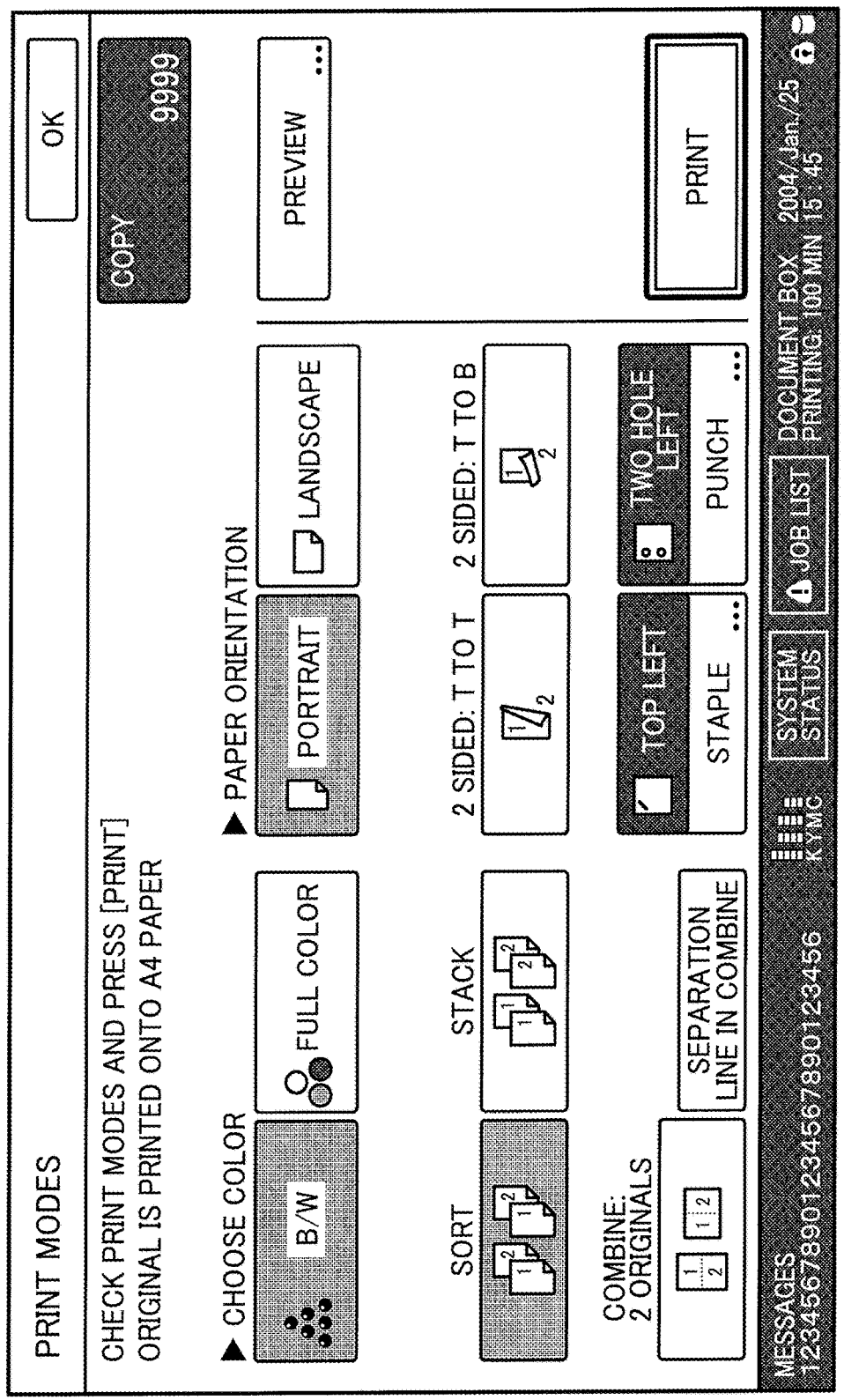
FIG. 5 is a diagram illustrating another shared operation screen that the electronic apparatus can display as an embodiment of the present invention.
Figure 6:
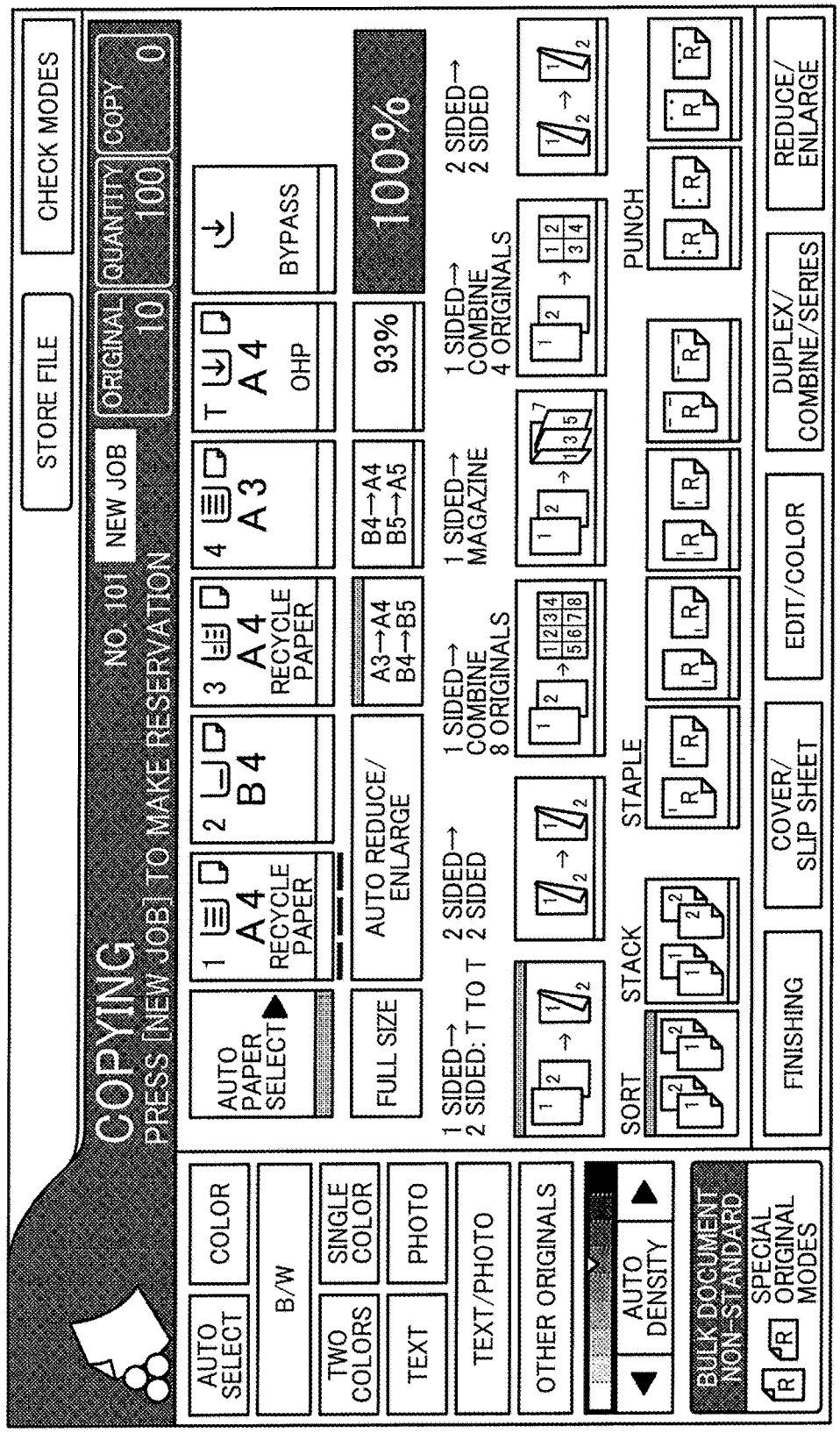
FIG. 6 is a diagram illustrating yet another shared operation screen that the electronic apparatus can display as an embodiment of the present invention.

In case of using the MFP 11 as the electronic apparatus, shared operation screens displayed on the control panel based on the operation screen information are shown in FIG. 4, FIG. 5, and FIG. 6. FIG. 4 is a diagram illustrating a home screen after authenticating a user. In this case, there are 99 registered users, and it is the home screen of the 99th registered user. The home screen is displayed firstly after a user logs in. This user registered 11 applications in the registration process of the operation screen information performed preliminarily. Three program names are registered as applications in addition to copy, document box, fax, printer, scanner, 2 SDKs, and URL described above. Each of 2 SDKs has different library sets, and they are tools for developing different applications. Each of three program names is an application related to copy, scanner, and fax.

An application that is environmental friendly and performs monochrome printing, duplex printing, and combined printing automatically, and an application that is security oriented and performs printing blotting out classified parts automatically are considered as examples of applications related to copying.

The user chooses an application by touching with the user's finger, and proceeds to the next screen. In case the electronic apparatus is the PC 14 or the shared server 15, the user can choose that by using the keyboard or the mouse.

For example, if the user chooses "copy" in the home screen shown in FIG. 4, the screen proceeds to a configuration screen shown in FIG. 5. The configuration screen shown in FIG. 5 is merely an example, and it is not limited to that. In FIG. 5, the configuration screen includes setting buttons such as color selection that selects monochrome or full-color, paper orientation (portrait or landscape), presence or absence of sort, presence or absence of stack, binding directions in case of duplex printing, presence or absence of combined printing, position setting of separation line in combine, presence or absence of staple and its location, presence or absence of punch and its location, preview, print, and OK as a print configuration screen. Also, the number of copies can be set in the configuration screen.

If the user presses the print button down in the configuration screen shown in FIG. 5, a print job starts, and a screen that indicates the executing status of the job is displayed as shown in FIG. 6. Since monochrome for color, portrait for paper direction, and enabling sort were selected in the previous configuration screen, the job executing screen indicates that monochrome and sort is reversed and selected too. Although not shown in the previous configuration screen, "text and photo" as an original type, duplex printing, and auto-selection for paper are set.

The configuration screen shown in FIG. 5 can be displayed based on the registered operation screen information. Therefore, the operation screen information can include setting information configured for each user as shown in FIG. 7. The setting information shown in FIG. 7 is a table associated with user names.

The setting information includes information such as single side or double side of an original is printed on single side or double side of paper or combined and printed on single side or double side of paper. Also, the setting information includes scaling factor in case of enlarging or reducing, the number of originals in case of combined printing, presence or absence of sort, staple, and punch, and their locations. Furthermore, the setting information includes time and date when this information is updated lastly.

In FIG. 5, "2 Sided: Top To Top" means that the MFP prints on one side of paper, turns the paper 180 degrees from side to side, and prints on the other side. "2 Sided: Top To Bottom" means that the MFP prints on one side of paper, turns the paper 180 degrees up and down, and prints on the other side. A rotate sort function aligns pages and ejects changing direction for each copy alternately. In combined copying, for example, "2 in 1" means two originals are printed on one side of paper.

If user A has the MFP 11 display the configuration screen on its control panel, regarding document setting and output setting, a setting that prints one side of an original on both sides of paper turning the paper from side to side and a setting that prints both sides of an original on both sides of paper are shown selectably. Other settings such as a setting that prints one side of an original on one side of a paper combined are displayed in grayscale so that they cannot be selected or are not displayed.

Regarding reduce/enlarge, 50% and 71% are displayed selectably. Regarding sort and stack function, sort, rotate sort, and stack are displayed selectably. Regarding staple function, "top left" and "left 2" are displayed selectably. Similarly, regarding these settings, other settings such as 141% are displayed in grayscale so that they cannot be selected or are not displayed.

In this case, configuration information of print modes is shown as an example. Similarly, copy modes, fax modes, and scan modes can be registered as a table associated with user names. Consequently, different modes can be displayed for each user, and that makes configuration setting easier.

After finishing a job properly, it is printed and output as configured. However, if some error occurs or printing is stopped by pressing the stop button, etc., an error message is displayed on the screen giving details, indicating how to resolve the error, cause of stopping, and resolution. The error message varies depending on the model since the position of the paper feed tray and its function vary depending by model.

Figure 8:
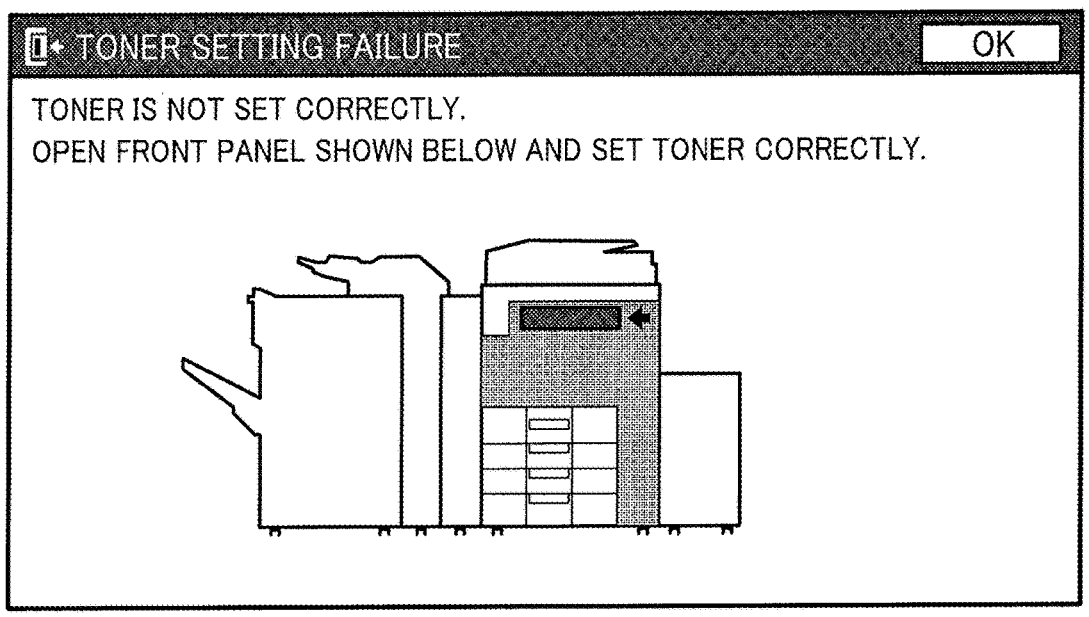
FIG. 8 is a diagram illustrating a model-specific screen that includes information specific to an electronic apparatus model as an embodiment of the present invention.
Figure 9:
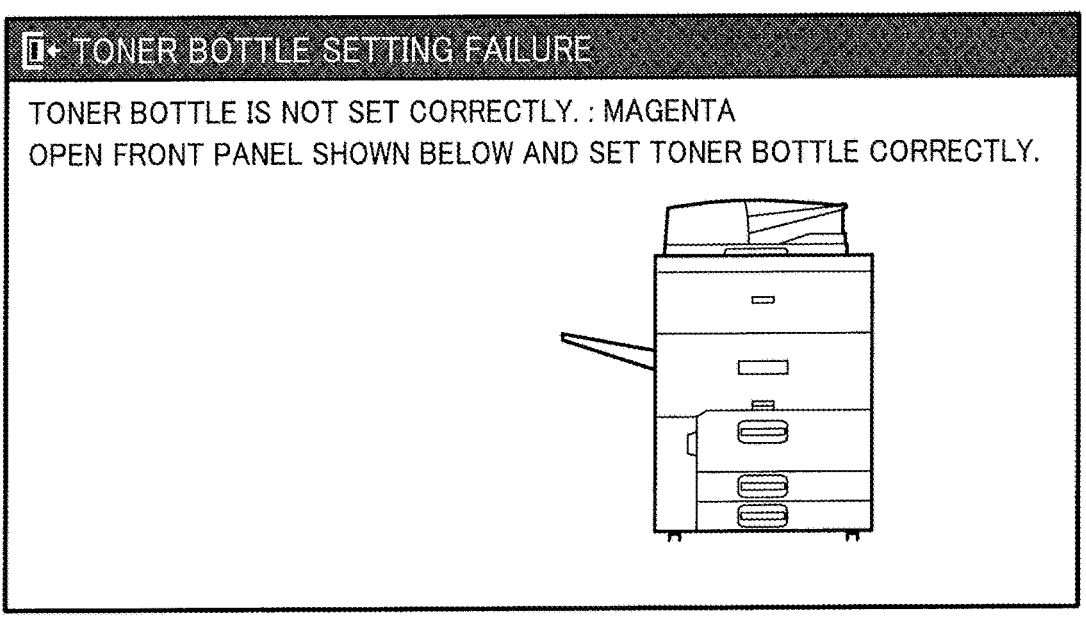
FIG. 9 is a diagram illustrating another model-specific screen that includes information specific to an electronic apparatus model as an embodiment of the present invention.

Examples of error messages are shown in from FIG. 8 to FIG. 11. In FIG. 8, a toner is not set properly, and guidance indicates "toner is not set properly, so please set the toner properly." In addition, toner position specific to the model is illustrated. In FIG. 9, an error occurs since a toner bottle is not set properly, and guidance that indicates position where the toner bottle is set is illustrated to prompt the user to set the toner bottle properly.

Figure 10:
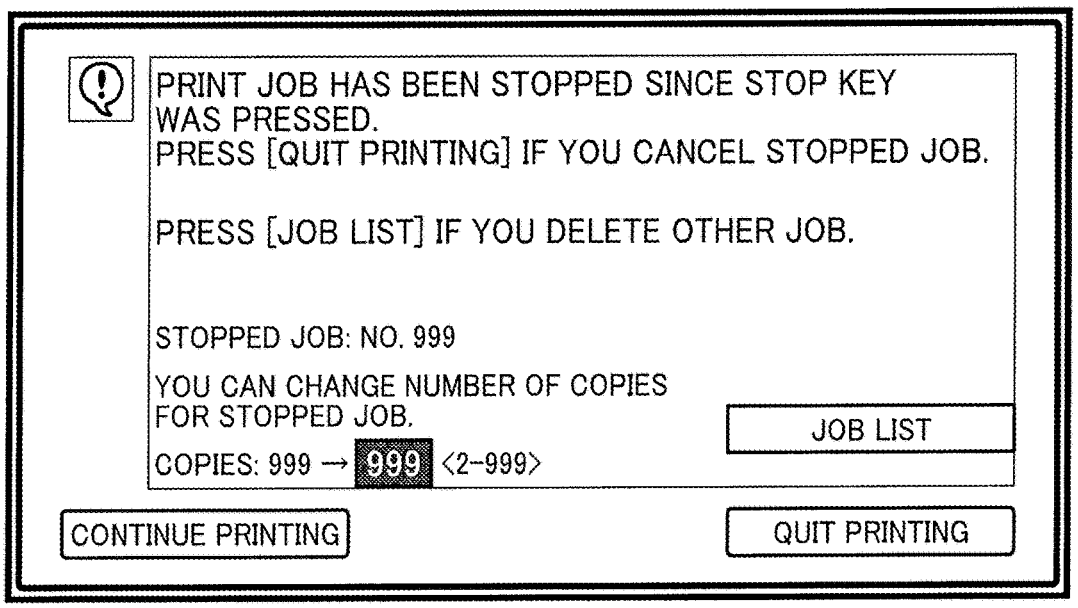
FIG. 10 is a diagram illustrating yet another model-specific screen that includes information specific to an electronic apparatus model as an embodiment of the present invention.
Figure 11:
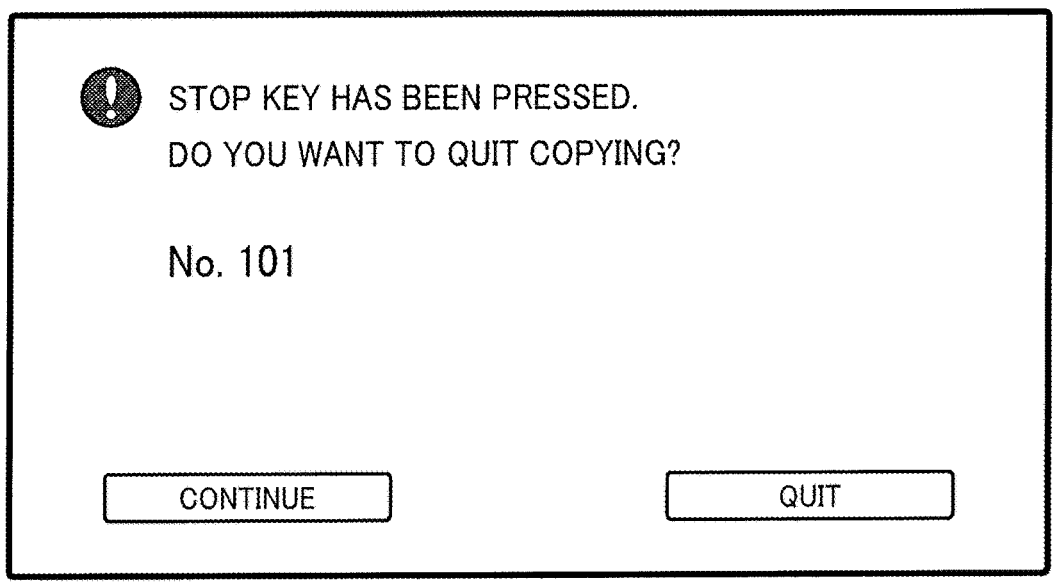
FIG. 11 is a diagram illustrating yet another model-specific screen that includes information specific to an electronic apparatus model as an embodiment of the present invention.

In FIG. 10, guidance specific to the model that indicates that a print job is stopped since the stop key is pressed is displayed. In addition, guidance specific to the model that prompts the user to press "Stop Printing" if the user stops the print job, to press "Resume Printing" if the user continues printing, and to press "Job List" if the user deletes other jobs is displayed. In FIG. 11, guidance specific to the model that indicates that the stop key is pressed, asks if the user stops copying, and displays an error number is displayed. In addition, guidance that prompts the user to press "Resume" if the user continues copying and to press "Stop" if the user stops copying is displayed.

Figure 12:
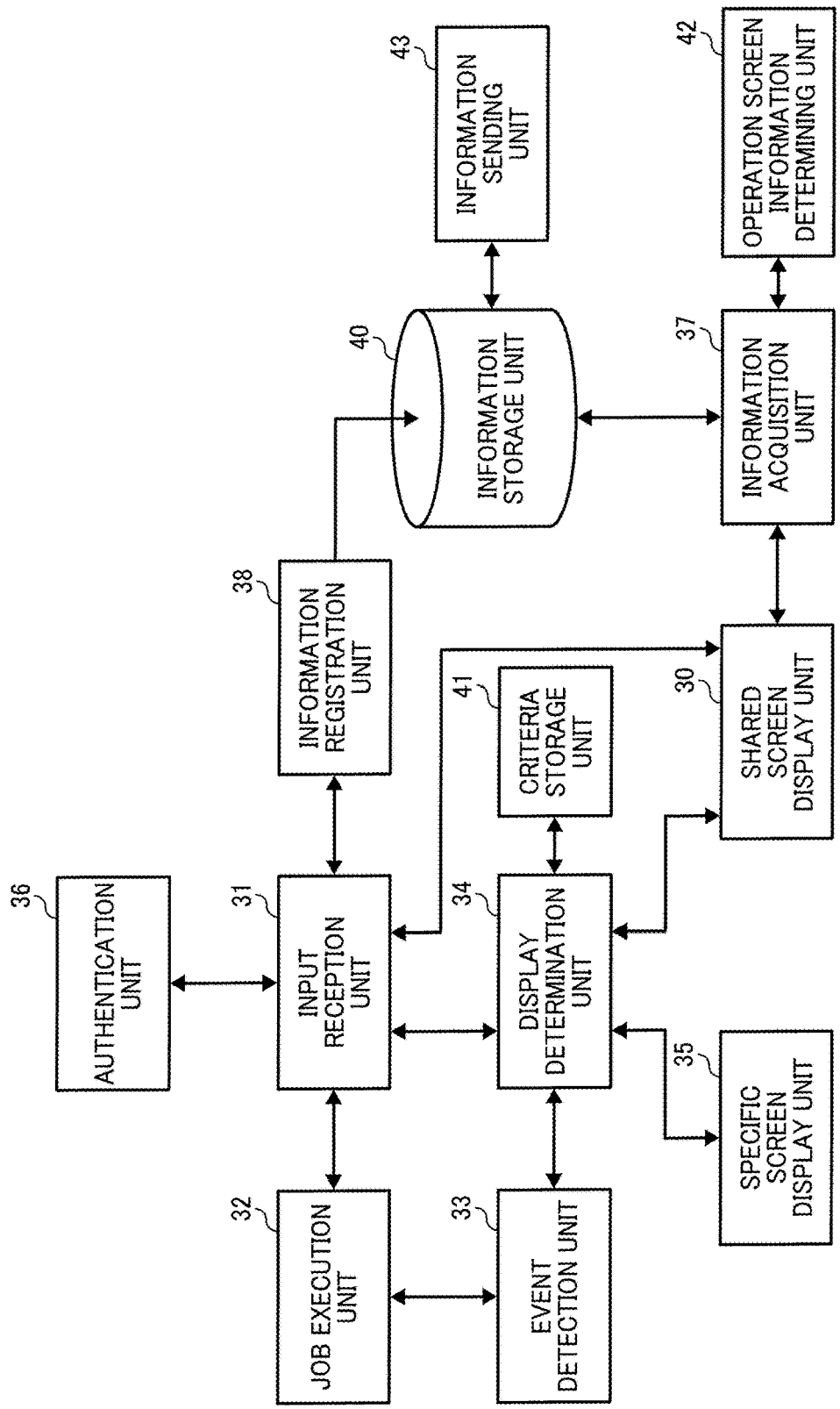
FIG. 12 is a block diagram illustrating functions in the electronic apparatus as an embodiment of the present invention.

Regarding operation screens such as the home screen shown in FIG. 4, the configuration screen shown in FIG. 5, and the executing status screen shown in FIG. 6, the shared operation screens are displayed based on the operation screen information so that each electronic apparatus in this embodiment displays the same screens. The configuration screen shown in FIG. 5 can be displayed based on the configuration information described above included in the operation screen information. Regarding the error messages shown in from FIG. 8 to FIG. 11, guidance specific to the electronic apparatus such as error details, cause of stopping printing, and resolution is displayed. To implement this function, the electronic apparatus includes functional units shown in FIG. 12. The CPU 20 can implement these functional units by executing a program read from the HDD 23 to the RAM 22 by the CPU 20 included in the electronic apparatus.

That is, the electronic apparatus includes a shared screen display unit 30 that displays the shared operation screen based on the operation screen information stored in one of multiple electronic apparatuses and available for the multiple electronic apparatuses, an input reception unit 31 that accepts input to the displayed shared operation screen, and a job execution unit 32 that executes a job based on the input accepted by the input reception unit 31. While the input reception unit 31 and the job execution unit 32 are separate in this case, alternatively a configuration is possible in which the job execution unit 32 accepts input and executes a job based on the input. Particularly, the job execution unit 32 executes printing based on settings configured in the configuration screen.

The electronic apparatus includes an event detector 33 that detects occurrence of a predetermined event that occurs during execution of the job. The event detector 33 detects such predetermined events such as error and stop of a job as described above. Also, the event detector 33 can detect release of error. The electronic apparatus further includes a display determination unit 34 that determines whether or not a screen (screen specific to model) that includes information specific to the electronic apparatus model needs to be displayed in case of detecting occurrence of the predetermined event. The display determination unit 34 determines that the screen specific to the electronic apparatus model needs to be displayed if the detected predetermined event is occurrence of error or stop of a job.

The electronic apparatus further includes a specific screen display unit 35 that changes the displayed shared operation screen into a model-specific screen if the display determination unit 34 determines that the screen specific to model needs to be displayed. In this case, the specific screen display unit 35 changes the displayed shared operation screen that indicates executing status shown in FIG. 6 into the screen specific to model shown in from FIG. 8 to FIG. 11.

The electronic apparatus further includes an authentication unit 36 that accepts inputting user identification information and performs user authentication and an information acquisition unit 37 that acquires operation screen information corresponding to the authenticated user from at least one of the multiple electronic apparatuses.

The authentication unit 36 stores user IDs associated with passwords as preregistered user identification information. If the user identification information is biometric information, the authentication unit 36 stores the preregistered biometric information. Subsequently, the authentication unit 36 accepts the input user identification information and searches for user identification information that matches the input user identification information among user identification information that the authentication unit 36 stores itself. If there is matching user identification information, that means the authentication process is successful, and the information acquisition unit 37 acquires the operation screen information that corresponds to the authenticated user.

In acquiring the operation screen information, the information acquisition unit 37 can select one or more electronic apparatuses based on the preset apparatus information. The information acquisition unit 37 acquires the operation screen information from the selected electronic apparatus. For example, if the information acquisition unit 37 is configured so that it acquires the information from the MFP 11 preliminarily, then it acquires the operation screen information from the MFP 11. In the case of acquiring the information from multiple electronic apparatuses, which information is adopted will be described later. Apparatus identification information such as apparatus name of the electronic apparatus, IP address allocated to the electronic apparatus, and Media Access Control (MAC) address can be used as apparatus information. Instead of selecting by the information acquisition unit 37, alternatively the electronic apparatus can further include an operation screen information determining unit 42 that determines which operation screen information stored in an electronic apparatus is used, and consequently the information acquisition unit 37 can acquire the determined operation screen information. In this case, the operation screen information determining unit 42 can perform the determination based on the preset apparatus information described above.

Any electronic apparatus connected to the network can hold the operation screen information. For example, self-owned PC 14 and the shared server 15 that can share information can hold the operation screen information. The operation screen information is information shown in FIG. 3 and FIG. 7 to display the shared operation screen shown in FIG. 4, FIG. 5, and FIG. 6.

The display determination unit 34 determines whether the shared operation screen is displayed or the screen specific to model is displayed when the event detector 33 detects occurrence of predetermined event. In this case, the display determination unit 34 can refer to criteria for changing screen stored in a criteria storage unit 41. Consequently, the display determination unit 34 can determine which screen is to be displayed referring to the criteria in addition to the event described above.

For example, if the event is "out of toner" or "out of paper" and special guidance as information specific to the model is unnecessary, it is possible to configure that as criteria not to change screens. It is to be noted that the criteria here is merely an example and is not limited thereto.

The electronic apparatus can further include an information registration unit 38. After the input reception unit 31 accepts the operation screen information and storage destination identification information to identify at least one electronic apparatus as storage destination, the information registration unit 38 stores the operation screen information in at lease one information storage unit 40 among multiple electronic apparatuses based on the at least one storage destination identification information. Examples of the storage destination identification information are apparatus name, IP address, and MAC address just the same as the apparatus information described above.

Each electronic apparatus includes the information storage unit 40 comprised of the HDD 23 to store the operation screen information and other units. The information registration unit 38 stores the operation screen information in the information storage unit 40 included in the electronic apparatus specified by the storage destination identification information. Consequently, if the electronic apparatus that includes the information registration unit 38 also includes the information storage unit 40 and the same electronic apparatus is specified as the storage destination, the operation screen information can be stored in the information storage unit 40 included in the same electronic apparatus.

If there is no input on specific storage destination identification information, the information registration unit 38 can store the operation screen information in all electronic apparatuses connected to the network 10. While it is sufficient to store the operation screen information in one electronic apparatus, the operation screen information can be stored in more than two electronic apparatuses as described above since it is impossible to acquire the operation screen information in case the electronic apparatus is turned off or is not connected to the network 10.

The electronic apparatus can further include an information sending unit 43 that sends the operation screen information that the electronic apparatus stores itself to another electronic apparatus in response to a request to acquire the operation screen information from the information acquisition unit included in the other electronic apparatus.

A display control method executed by the electronic apparatus will be described below with reference to FIG. 13 to FIG. 16.

FIG. 13 is a sequence diagram illustrating a process that registers the operation screen information for each user. The operation screen information can be registered for each user, and each user can have one shared operation screen be displayed based on the registered operation screen information.

For example, user A chooses one electronic apparatus, inputs user ID and password, and logs in. The input reception unit 31 accepts those inputs and passes them as login information to the authentication unit 36. The authentication unit 36 searches for matching user ID and password. After receiving notification of successful authentication from the authentication unit 36, the input reception unit 31 has a message of successful authentication displayed and responds to the login. In this case, it is possible either to have a template of the shared operation screen be displayed or to send a request to display and have the template be displayed in response to the request. If the authentication fails, the input reception unit 31 responds to that by having a message of failed authentication displayed on the screen.

User A performs inputting on the displayed template of the shared operation screen and configures the shared operation screen as the operation screen information. After accepting the operation screen information, the input reception unit 31 passes the operation screen information to the information registration unit 38. Subsequently, the information registration unit 38 stores the operation screen information in the specified storage destination based on the storage destination identification information accepted with the operation screen information. In this case, the storage destination identification information is configured to store apparatus A, B, and C. Apparatus A, B, and C are electronic apparatuses connected to the same network 10.

Firstly, the information registration unit 38 establishes communication between apparatus A and sends the operation screen information and the request to store to apparatus A. After receiving the request to store, apparatus A stores the received operation screen information associated with user identification information to identify user A such as user name. Apparatus A stores the operation screen information in the information storage unit 40*a* that apparatus A includes itself such as the HDD for example. After finishing storing, apparatus A notifies the information registration unit 38 of finishing storing.

Next, the information registration unit 38 establishes communication with apparatus B and sends the operation screen information and a request to store it to apparatus B. After receiving the request to store, apparatus B stores the received operation screen information in the information storage unit 40*b* that apparatus B includes itself associated with user name. After finishing storing, apparatus B notifies the information registration unit 38 of finishing storing.

Lastly, the information registration unit 38 establishes communication with apparatus C and sends the operation screen information and a request to store it to apparatus C. After receiving the request to store, apparatus C stores the received operation screen information in the information storage unit 40*b* that apparatus C includes itself associated with user name. After finishing storing, apparatus C notifies the information registration unit 38 of finishing storing. Subsequently, the information registration unit 38 notifies the input reception unit 31 of finishing storing entirely, and the input reception unit 31 has a message that registration is finished displayed.

Figure 14B:
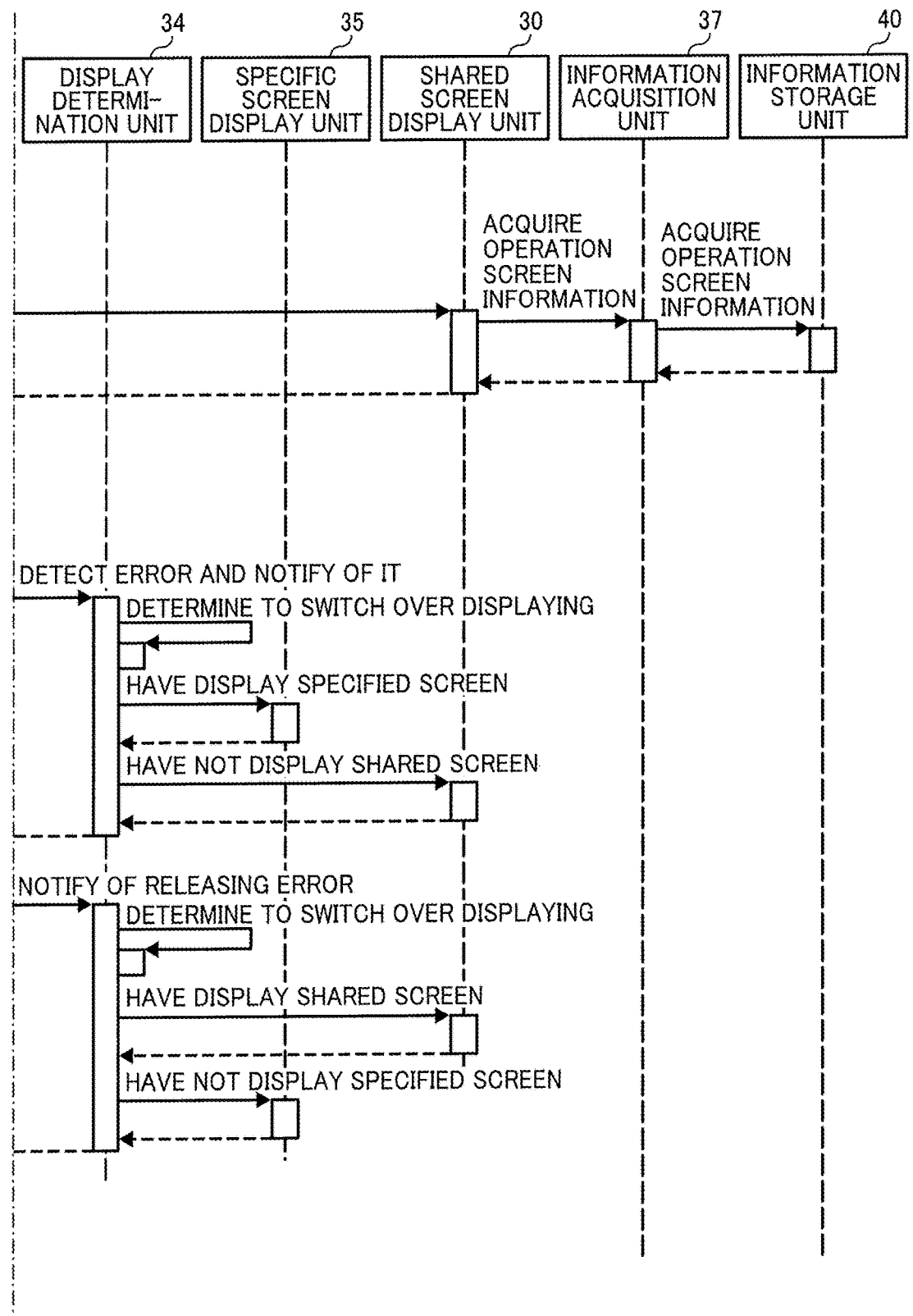

FIGS. 14A and 14B are sequence diagrams illustrating a process in case an error occurs during a job. User A chooses one electronic apparatus, inputs user ID and password, and logs in. The input reception unit 31 accepts those inputs and passes them as login information to the authentication unit 36. The authentication unit 36 searches for matching user ID and password. After receiving notification of successful authentication from the authentication unit 36, the input reception unit 31 has a message of successful authentication displayed and responds to the login. If the authentication fails, the input reception unit 31 responds to that by having a message of failed authentication displayed on the screen.

After receiving the request from the input reception unit 31, the shared screen display unit 30 passes login information such as user ID and password received from the input reception unit 31 to the information acquisition unit 37. The information acquisition unit 37 acquires the operation screen information registered for user A from at least one of the multiple electronic apparatuses based on the login information. The information acquisition unit 37 can choose the electronic apparatus by using the preset apparatus information and acquire the operation screen information. If the number of sets of apparatus information is one, the information acquisition unit 37 acquires the operation screen information from the one electronic apparatus. If the number of sets of apparatus information is more than two, the information acquisition unit 37 acquires the operation screen information from those more than two electronic apparatuses.

Instead of selecting the electronic apparatus based on the preset apparatus information, after inquiring of each of multiple electronic apparatuses connected to the network 10, it is possible to acquire the operation screen information registered for user A from the electronic apparatus that stores the information. Here, more than two electronic apparatuses can store the operation screen information registered for user A. In this case, if the operation screen information is the same, it is possible to select one set of information and acquire it. Otherwise, after the operation screen information determining unit 42 described above determines which operation screen information is to be used, the information acquisition unit 37 can perform the acquisition based on the determined operation screen information.

If the operation screen information is not the same, then since registration time/date and updated time/date are also associated and stored as attribute information along with user names, it is possible to select the electronic apparatus that stores the latest operation screen information and acquire the latest operation screen information from the selected electronic apparatus. Otherwise, after the operation screen information determining unit 42 determines which operation screen information is to be used based on the registered time/date or updated time/date, the information acquisition unit 37 can acquire the operation screen information based on the determined operation screen information.

After acquiring the operation screen information, the information acquisition unit 37 returns the operation screen information to the shared screen display unit 30 to have the shared screen display unit 30 display the operation screen based on the acquired operation screen information. The shared screen display unit 30 displays the shared operation screen for user A based on the operation screen information. When the shared screen display unit 30 displays the shared operation screen, the shared screen display unit 30 notifies the input reception unit 31 of display of the shared operation screen. After user A performs inputting on the displayed shared operation screen, the input reception unit 31 sends the input to the job execution unit 32, and the job execution unit 32 executes a job based on the input.

The event detection unit 33 detects a predetermined event occurring in the apparatus as an error. Subsequently, the job execution unit 32 stops executing the job temporarily, and the event detection unit 33 notifies the display determination unit 34 of detecting the error and the type of error. An example of a type of error is a paper jam. After receiving the notification of detecting the error, the display determination unit 34 determines whether it commands to display the shared operation screen or the screen specific to the model based on type of error.

If the display determination unit 34 determines that it commands to display the screen specific to the model, the display determination unit 34 sends a command to the specific screen display unit 35, and the specific screen display unit 35 changes the shared operation screen into the screen specific to the model. Also, the display determination unit 34 commands the shared screen display unit 30 not to display the shared operation screen.

User A recognizes that the error has occurred by browsing the screen displayed by the specific screen display unit 35, and can resolve the error as instructed by the displayed error message. In this case, since the error is a paper jam, user A gets rid of the jammed paper after opening the cover.

After getting rid of the jammed paper, user A presses the OK button, etc., and the input reception unit 31 accepts that the error has been resolved. Either the input reception unit 31 can notify the display determination unit 34 of resolving the error directly, or the input reception unit 31 can notify the display determination unit 34 of resolving the error via the job execution unit 32 and the event detector 33.

After receiving the notification of resolving the error, the display determination unit 34 determines that the shared operation screen is to be displayed since it is unnecessary to display information specific to the model. After receiving the determination, the specific screen display unit 35 commands not to display the screen specific to the model displayed meanwhile, and the shared screen display unit 30 changes the screen specific to the model into the shared operation screen.

The job execution unit 32 resumes executing the job that has been stopped. For example, the job execution unit 32 can resume executing the job after receiving notification of resolving the error from the input reception unit 31. Alternatively, the job execution unit 32 can resume executing the job after the shared screen display unit 30 changes into the shared operation screen. To display the executing status of the job appropriately, it is preferable to resume executing the job after changing into the shared operation screen.

When the resumed job ends, the job execution unit 32 notifies the input reception unit 31 of finishing the job and has the message of finishing the job displayed. User A can recognize that the job has ended by browsing this notification.

Figure 15:
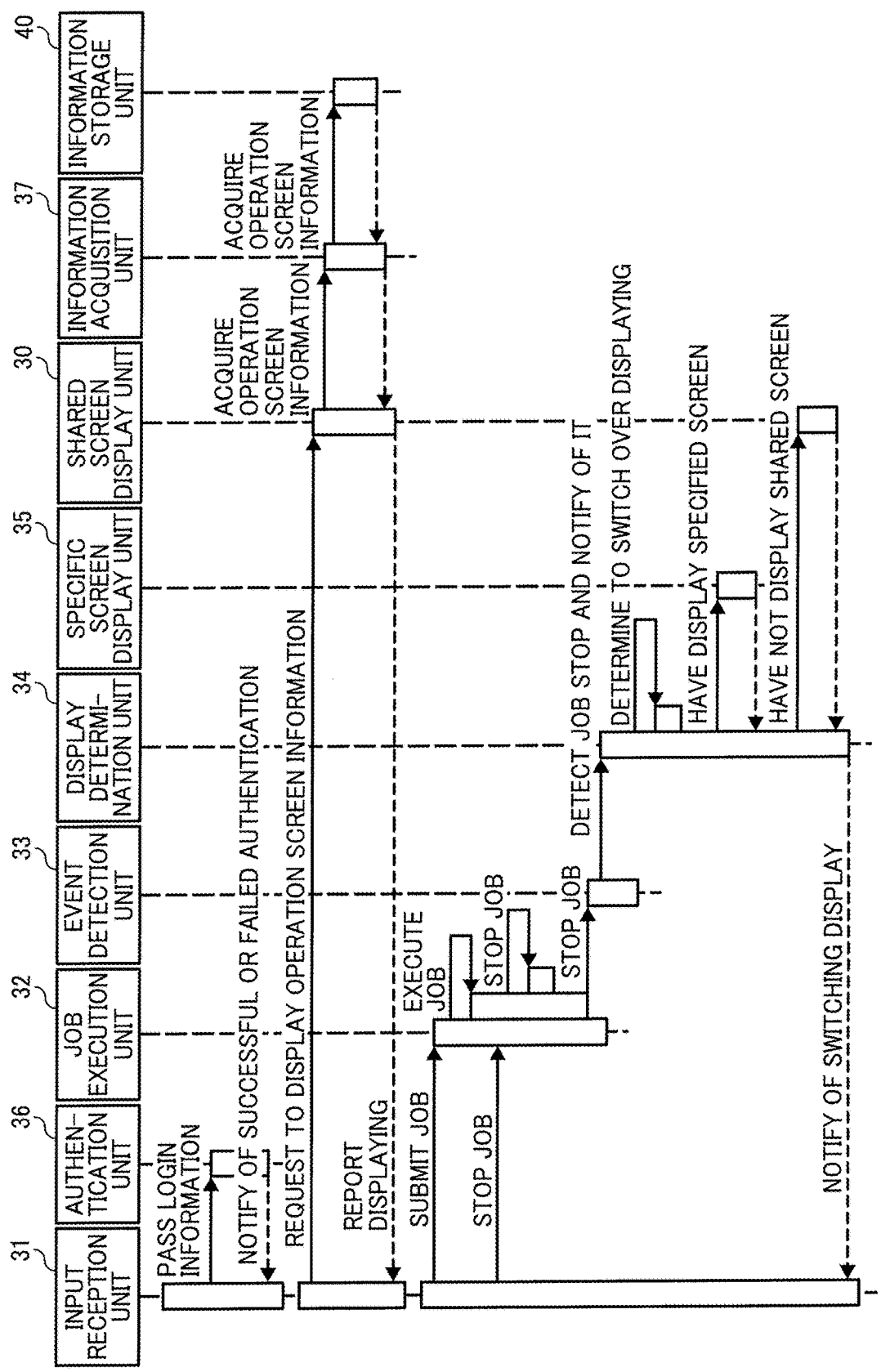
FIG. 15 is a sequence diagram illustrating a process in case of receiving a command to stop a job during the job as an embodiment of the present invention.

FIG. 15 is a sequence diagram illustrating a process in the case not of an error occurring but of user A stopping the job during execution of the job. The process shown in FIG. 15 is generally the same as the process shown in FIGS. 14A and 14B. However, after the job execution unit 32 starts the job, user A inputs a command to stop the job at arbitrary timing. The input reception unit 31 accepts the input information on stopping the job and sends it to the job execution unit 32. After receiving the information, the job execution unit 32 stops the job.

After the job execution unit 32 stops the job, the event detector 33 detects the stop as the predetermined event. Subsequently, the event detector 33 notifies the display determination unit 34 of detecting the stopping of the job.

After receiving the notification, the display determination unit 34 determines that the screen specific to the model is to be displayed.

In case of determining that the screen specific to the model is to be displayed, the display determination unit 34 commands the specific screen display unit 35 to do that, and the specific screen display unit 35 changes the shared operation screen into the screen specific to the model. Also, the display determination unit 34 commands the shared screen display unit 30 not to display the shared operation screen.

Figure 16:
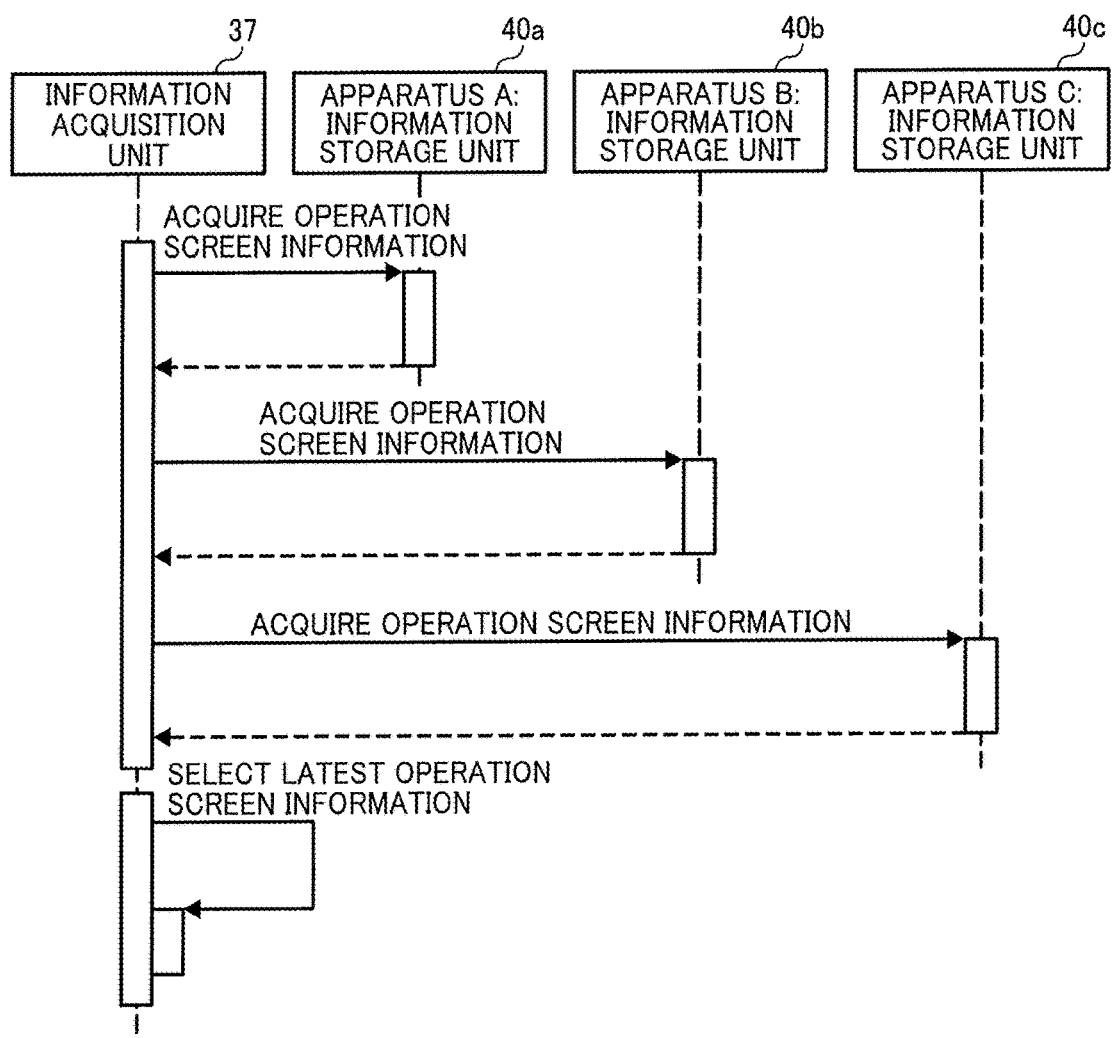
FIG. 16 is a sequence diagram illustrating a process that acquires operation screen information as an embodiment of the present invention.

FIG. 16 is a sequence diagram illustrating a process of determining which information is to be selected in case multiple electronic apparatuses store the operation screen information for user A. If apparatuses A, B, and C are configured as the predetermined apparatus information, the information acquisition unit 37 sends a request to acquire the operation screen information to each of apparatuses A, B, and C and acquires the operation screen information.

The information acquisition unit 37 determines which registered time/date or updated time/date attached to the operation screen information is the latest and selects the latest operation screen information as the operation screen information to be acquired.

As described above, it is possible to specify the target from which the operation screen information is to be acquired by presetting the apparatus information. In particular, by presetting the self-owned PC and the shared server 15 shown in FIG. 1, it is possible to specify the PC or the shared server 15 and acquire the operation screen information. If the self-owned PC is set as the apparatus information, it is always possible to acquire the latest operation screen information by having the self-owned PC logged in.

Also, it is possible to display the shared operation screen at the user's own convenience by presetting criteria for changing screens. Furthermore, it is possible to keep displaying the shared operation screen in case special guidance is unnecessary. Since the information registration unit 38 can store and register information in a specified destination, it is possible to register information in the self-owned PC and other apparatuses such as MFPs and shared servers as backup.

Consequently, the screen specific to the model that includes information specific to the model is displayed in case of error, etc. Otherwise, it is possible to use the shared operation screen. Therefore, it is possible to use any apparatus at the same degree of usability.

Figure 17:
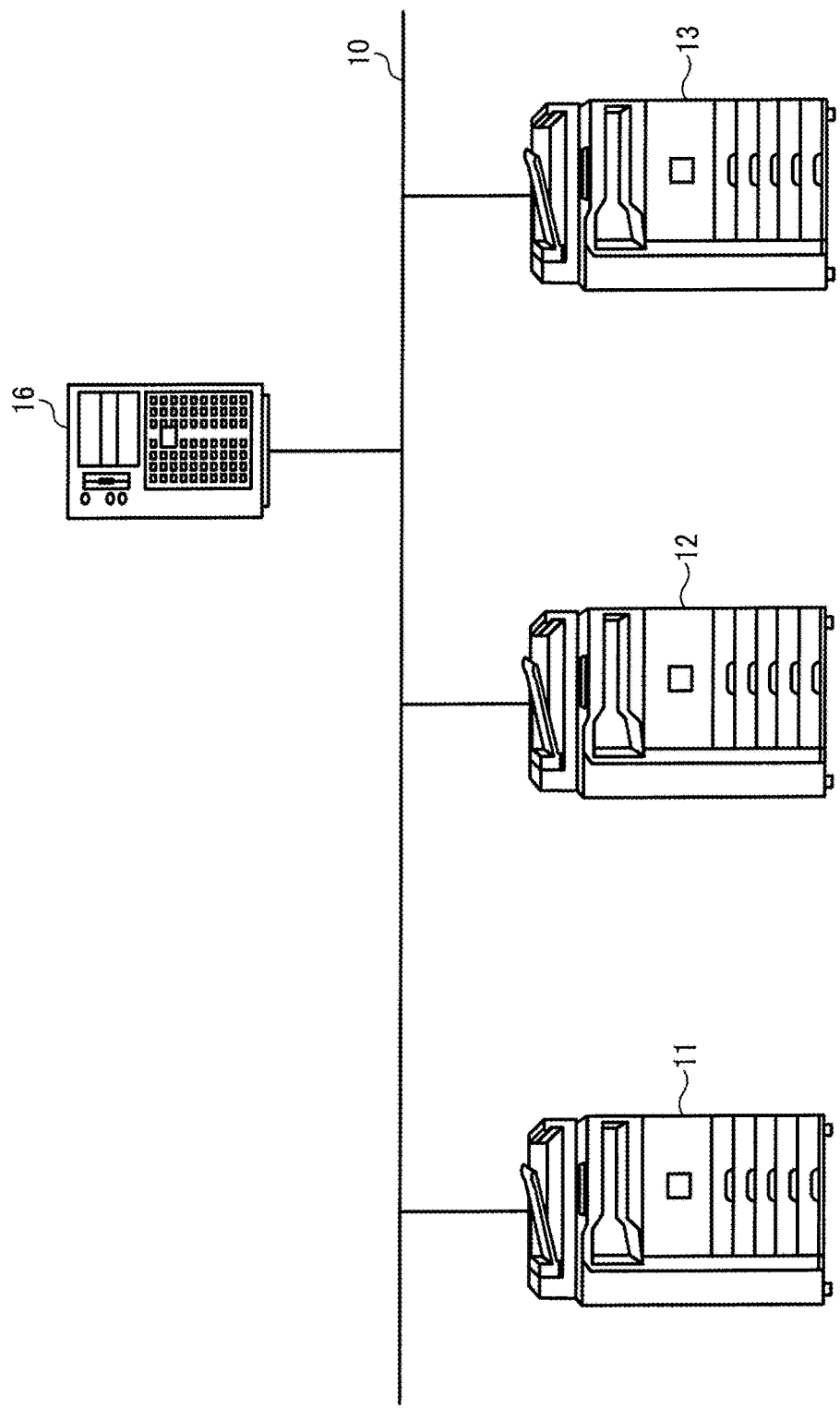
FIG. 17 is a diagram illustrating another configuration of a network system as an embodiment of the present invention.

A network system is comprised of multiple electronic apparatuses connected to a network. Accordingly, it can adopt the configuration shown in FIG. 17 other than the configuration shown in FIG. 1. FIG. 17 is a diagram illustrating another configuration of a network system comprised of multiple electronic apparatuses connected to the network. In this configuration, as multiple electronic apparatuses, three MFPs 11, 12, and 13 and a server 16 as information processing apparatuses are connected to the network 10. At least one of the MFPs 11, 12, and 13 is a different model of MFP from any of the others. The MFPs 11, 12, and 13 are described above and thus a description of their configurations and functions is omitted here.

The server 16 has the hardware configuration as shown in FIG. 2 and stores and holds the operation screen information described above. The MFPs 11, 12, and 13 do not store the operation screen information but store the apparatus information of the server 16 designated as the registering destination of the operation screen information. Examples of the apparatus information are apparatus identification information such as apparatus name, IP address, and MAC address of the server 16. Consequently, if the shared operation screen is displayed on either of the MFPs 11, 12, or 13, either of the MFPs 11, 12, or 13 acquires the operation screen information from the server 16 designated as the specified electronic apparatus and displays the shared operation screen. If the operation screen information is registered, it is registered in the server 16.

In this system configuration, a display control method performed by the electronic apparatus will be described below with reference to FIG. 18.

Figure 18:
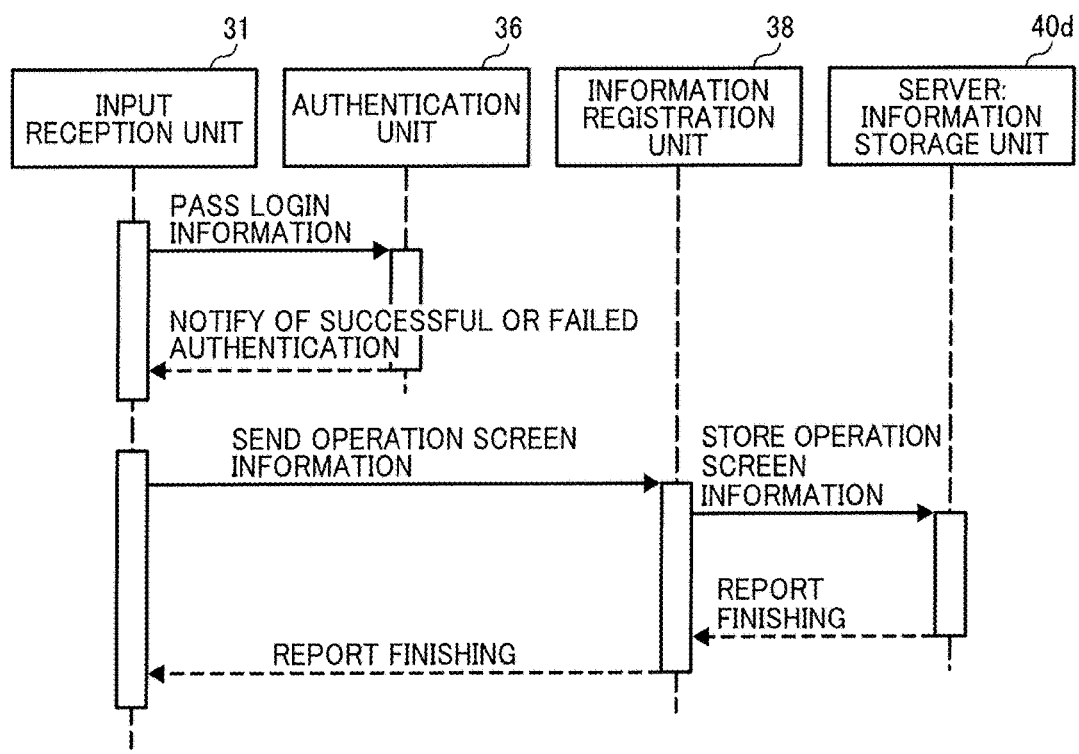
FIG. 18 is a sequence diagram illustrating another process that registers operation screen information as an embodiment of the present invention.

FIG. 18 is a sequence diagram illustrating another process that registers operation screen information for each user. In the embodiment shown in FIG. 13, each of apparatuses A, B, and C store the operation screen information, and each of apparatuses A, B, and C report finishing storing separately. However, in this embodiment, an information storage unit 40d included in the server 16 stores the operation screen information, and the server 16 reports finishing storing. Since the server 16 stores the operation screen information, the operation screen information stored in the server 16 is always the latest. Therefore, information of last updated date/time as shown in FIG. 3 and FIG. 7 is unnecessary since it is unnecessary to determine which operation screen information is the latest. Consequently, in this embodiment, it is unnecessary to include information of last updated date/time in the operation screen information.

After starting the job, the process performed in case an error occurring during the job is the same as the process shown in FIGS. 14A and 14B. However, in this embodiment, the information storage unit is implemented in the server 16. The process performed in case of stopping the job by user A during the job is the same as the process shown in FIG. 15 instead of implementing the information storage unit in the server 16.

As described above, by adopting the configuration that the server 16 includes the information storage unit 40d and is designated as the storage destination of the operation screen information, the latest operation screen information can be stored instead of using the storage device included in the MFPs 11, 12, and 13. Also, by designating the server 16 as the acquisition source, it is always possible to acquire the latest operation screen information from the server 16 in case communication with the server 16 is established.

Although only one server 16 is shown in FIG. 16, multiple servers can be connected to the network 10, and it is possible to designate one server as the acquisition source and acquire the operation screen information from the server. It is possible that the server specified for a user either stores the operation screen information for the user or inquiries of another server and acquires the operation screen information from the server. While three MFPs 11, 12, and 13 are shown in FIG. 17, it is possible that one, two, or more than four MFPs are included.

In addition, since the server 16 is one of the multiple electronic apparatuses, in case the server 16 includes a display unit, it is possible to display the operation screen information on the display unit.

With the present invention, the shared operation screen can be displayed on different models of electronic apparatuses.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

In one example, the present invention may reside in an electronic apparatus connectable to an information processing apparatus via a network. The electronic apparatus includes a first information acquisition unit that acquires, from the information processing apparatus, operation screen information stored in the information processing apparatus, a shared screen display unit that displays a shared operation screen shared between the electronic apparatus and another electronic apparatus of a different model from the electronic apparatus on a display unit based on the operation screen information acquired by the information acquisition unit, a job execution unit that executes a job based on input to the shared operation screen displayed on the display unit by the shared screen display unit, an event detector that detects a predetermined event that occurs during the job execution, a display determination unit that determines whether or not a specific screen including information specific to the electronic apparatus model needs to be displayed in response to the predetermined event detected by the event detector, and a specific screen display unit that changes the display of the display unit from the shared operation screen to the specific screen when the display determination unit determines that the specific screen needs to be displayed.

In one example, the present invention may reside in a network system, which includes the electronic apparatus, and the other electronic apparatus having the model different from the model of the electronic apparatus.

In one example, a method of controlling display, performed by the electronic apparatus connectable to the information processing apparatus via the network, includes the steps of acquiring, from the information processing apparatus, operation screen information stored in the information processing apparatus, displaying a shared operation screen shared between the electronic apparatus and another electronic apparatus of a different model from the electronic apparatus on a display based on the operation screen information, executing a job based on input to the shared operation screen displayed on the display, detecting a predetermined event that occurs during the job execution, determining whether or not a specific screen including information specific to the electronic apparatus model needs to be displayed in response to the predetermined event, and changing the display of the display from the shared operation screen to the specific screen when the determining step determines that the specific screen needs to be displayed.

In one example, the present invention may reside in a non-transitory recording medium storing a plurality of instructions which, when executed by a processor, cause the processor to perform any one of the above-described display control methods.

What is claimed is:

1. An image forming apparatus, comprising:
   at least one of a printer and a scanner;
   a network interface;
   a display; and
   processing circuitry configured to
   send a request to an information processing apparatus through the network interface,
   receive operation screen data from the information processing apparatus, the operation screen data being sent in response to the request,
   display an operation screen including a screen to receive an input of a user operation to conduct an image forming job on the display based on the received operation screen data, the operation screen being shared between the image forming apparatus and another image forming apparatus of a different model from the image forming apparatus,
   conduct the image forming job using the at least one of the printer and the scanner based on the user operation input via the screen included in the operation screen displayed on the display, and
   after the user operation to conduct the image forming job is input to the operation screen displayed on the display, in response to detecting an error in conducting the image forming job, automatically display, on the display, a specific screen that includes error information specific to the model of the image forming apparatus,
   wherein the specific screen includes error information that is different between the image forming apparatus and the another image forming apparatus, and
   the image forming apparatus stores a first specific screen corresponding to the model of the image forming apparatus, and the another image forming apparatus stores a second specific screen corresponding to another model of the another image forming apparatus.

2. The image forming apparatus according to claim 1, wherein the processing circuitry, in response to releasing the error, no longer displays the specific screen on the display.

3. A system comprising:
   the image forming apparatus of claim 1, and
   the another image forming apparatus, the another image forming apparatus being an image forming apparatus of the another model different from the model of the electronic apparatus and having another processing circuitry configured
   to display the operation screen on another display,
   conduct another job, and
   in response to detecting an error in conducting the another job, automatically display, on the another display, the operation screen to another specific screen that includes error information specific to the another model of the another image forming apparatus.

4. A method performed by an image forming apparatus including at least one of a printer and a scanner, the method comprising:
   sending a request to an information processing apparatus through a network interface,
   receiving operation screen data from the information processing apparatus, the operation screen data being sent in response to the request,
   displaying an operation screen including a screen to receive an input of a user operation to conduct an image forming job on a display based on the received operation screen data, the operation screen being shared between the image forming apparatus and another image forming apparatus of a different model from the image forming apparatus,
   conducting the image forming job using the at least one of the printer and the scanner based on the user operation input via the screen included in the operation screen displayed on the display, and after the user operation to conduct the image forming job is input to the operation screen displayed on the display, in response to detecting an error in conducting the image forming job, displaying automatically, on the display, a specific screen that includes error information specific to the model of the image forming apparatus, wherein the specific screen includes error information that is different between the image forming apparatus and the another image forming apparatus, and the image forming apparatus stores a first specific screen corresponding to the model of the image forming apparatus, and the another image forming apparatus stores a second specific screen corresponding to another model of the another image forming apparatus.

5. The method of claim 4, further comprising, in response to releasing the error no longer displaying the specific screen on the display.

6. The method of claim 4, further comprising detecting the error in conducting the image forming job.

7. The method of claim 4, wherein the step of displaying the specific screen comprises displaying the specific screen in a size smaller than the operation screen and overlapping the operation screen.

* * * * *